US005761653A

United States Patent [19]
Schiefer et al.

[11] Patent Number: 5,761,653
[45] Date of Patent: Jun. 2, 1998

[54] METHOD FOR ESTIMATING CARDINALITIES FOR QUERY PROCESSING IN A RELATIONAL DATABASE MANAGEMENT SYSTEM

[75] Inventors: Bernhard Schiefer, Scarborough; Lori G. Strain, Etobicoke; Weipeng P. Yan, Emeryville, all of Canada

[73] Assignee: International Business Machines Corporation, Armonk, N.Y.

[21] Appl. No.: 626,887

[22] Filed: Apr. 3, 1996

[30] Foreign Application Priority Data

Apr. 3, 1995 [CA] Canada ................................. 2146171

[51] Int. Cl.$^6$ ............................................. G06F 17/30
[52] U.S. Cl. .............................. 707/2; 707/3; 395/74; 700/2
[58] Field of Search .................... 395/602, 74; 707/2, 707/3; 700/2

[56] References Cited

U.S. PATENT DOCUMENTS

| | | | |
|---|---|---|---|
| 4,769,772 | 9/1988 | Dwyer ........................... | 364/300 |
| 5,325,525 | 6/1994 | Shan et al. .................... | 395/650 |
| 5,345,585 | 9/1994 | Iyer et al. ..................... | 395/600 |
| 5,367,675 | 11/1994 | Cheng et al. .................. | 395/600 |
| 5,469,568 | 11/1995 | Schiefer et al. ............... | 395/600 |
| 5,544,355 | 8/1996 | Chaudhuri et al. ............ | 395/602 |
| 5,598,559 | 1/1997 | Chaudhuri ..................... | 395/602 |
| 5,608,904 | 3/1997 | Chaudhuri et al. ............ | 395/602 |
| 5,615,361 | 3/1997 | Leung et al. .................. | 395/603 |

OTHER PUBLICATIONS

Dey et al. "Synthesizing Designs with low-Cardinality minimum Feedback Vertex Set for Partial Scan Application," IEEE, pp. 2-7, Jun. 1994.

Calvanese et al. "In the Interaction between ISA and Cardinality Constraint" IEEE, pp. 204–213, Feb. 1994.

Fain et al. "Hierarchical Constraint Solving in the Parametric form with Applications to Efficient Symbolic Simulation Verification", IEEE pp. 304–307, Feb. 1993.

Wang et al "Distributed Query Optimization by One-Shot Fixed-Precision Semi-Join Execution", IEEE, pp. 756–763, Jan. 1991.

Maro et al. "Domain and active Domains: What this Distinction Implies for the EStimation of Projection Sizes in Relational Databases", IEEE, pp. 641–655 vol. 7 No. 4, Aug. 1995.

Sood et al. "Computational Complexity of Sorting and Joining Relations with Duplicates", IEEE, pp. 496–503, vol. 3, No. 4, Dec. 1991.

Sood et al. "Sorting and Joining Relations with Duplicates Attribute Value", IEEE, pp. 30–36, Apr. 1990.

Wang et al. "Distributed Query Optimization by One-Shot Fixed-Precision Semi-join Execution", IEEE, pp. 756–763, Jun. 1990.

*Primary Examiner*—Thomas G. Black
*Assistant Examiner*—Jean M. Corrielus
*Attorney, Agent, or Firm*—Merchant, Gould, Smith, Edell, Welter, & Schmidt

[57] ABSTRACT

The present invention provides a method for estimating cardinalities for query processing in a relational database management system. The present method is suitable for use with a query optimizer for estimating cardinalities for sets of columns or keys resulting from a grouping operation or a duplicate removal operation.

40 Claims, 2 Drawing Sheets

METHOD FOR ESTIMATING CARDINALITIES FOR QUERY PROCESSING IN A RELATIONAL DATABASE MANAGEMENT SYSTEM

FIELD OF THE INVENTION

This invention relates to database management systems and more particularly to a method for estimating key cardinalities for query processing in a relational database management system.

BACKGROUND OF THE INVENTION

A database management system (DBMS) comprises the combination of an appropriate computer, direct access storage devices (DASD) or disk drives, and database management software. A relational database management system is a DBMS which uses relational techniques for storing and retrieving information. The relational database management system or RDBMS comprises computerized information storage and retrieval systems in which data is stored on disk drives or DASD for semi-permanent storage. The data is stored in the form of tables which comprise rows and columns. Each row or table has one or more columns.

The RDBMS is designed to accept commands to store, retrieve, and delete data. One widely used and well known set of commands is based on the Structured Query Language or SQL. The term query refers to a set of commands in SQL for retrieving data from the RDBMS. The definitions of SQL provide that a RDBMS should respond to a particular query with a particular set of data given a specified database content. SQL however does not specify the actual method to find the requested information in the tables on the disk drives. There are many ways in which a query can be processed and each consumes a different amount of processor and input/output access time. The method in which the query is processed, i.e. query plan, affects the overall time for retrieving the data. The time taken to retrieve data can be critical to the operation of the database. It is therefore important to select a method for finding the data requested in a query which minimizes the computer and disk access time, and therefore, optimizing the cost of doing the query.

A database system user retrieves data from the database by entering requests or queries into the database. The RDBMS interprets the user's query and then determines how best to go about retrieving the requested data. In order to achieve this, the RDBMS has a component called the query optimizer. The RDBMS uses the query optimizer to analyze how to best conduct the user's query of the database with optimum speed in accessing the database being the primary factor. The query optimizer takes the query and generates a query execution plan. The query plan comprises a translation of the user's SQL commands in terms of the RDBMS operators. There may be several alternative query plans generated by the query optimizer, each specifying a set of operations to be executed by the RDBMS. The many query plans generated for a single query ultimately differ in their total cost of obtaining the desired data. The query optimizer then evaluates these cost estimates for each query plan in order to determine which plan has the lowest execution cost. In order to determine a query plan with the lowest execution cost, the query optimizer uses specific combinations of operations to collect and retrieve the desired data. When a query execution plan is finally selected and executed, the data requested by the user is retrieved according to that specific query plan however manipulated or rearranged.

In a SQL based RDBMS the query plan comprises a set of primitive operations or commands, e.g. JOIN; a sequence in which the retrieve operations will be executed, e.g. JOIN ORDER; a specific method for performing the operation, e.g. SORT-MERGE JOIN; or an access method to obtain records from the base relations, e.g. INDEX SCAN. In most database systems, particularly large institutional systems, a cost-based query optimizer will be utilized. A cost-based query optimizer uses estimates of I/O and CPU resource consumption in determining the most efficient query execution plan. Because both I/O and CPU resource consumption depend on the number of rows that need to be processed, knowledge of cardinalities, i.e. the number of rows to be processed at various stages in the query execution plan, is crucial to the generation and selection of an efficient query execution plan.

One important cardinality is the number of rows which results from a grouping operation or a duplicate removal operation. A grouping operation gathers together rows having the same value on specified columns, known as grouping columns, to produce a single row. The duplicate removal operation is a special case of grouping and involves keeping only one row for a group of identical rows.

Both the grouping and duplicate removal operations have the same characteristic, namely, the production of a resulting table in which no two rows share the same value for a set of columns. For the grouping operation, these columns are termed the grouping columns, and in the duplicate removal operation, the resulting columns are the retrieved columns. (In the SQL query language, the GROUP BY command provides a grouping operation and the DISTINCT command provides a duplicate removal operation.) The resulting columns are termed a "key". If the number of distinct values for certain columns or key can be accurately estimated, then the cardinality can be determined after the columns are grouped. The cardinality is known as the "key cardinality". Because the key cardinality value can affect the performance of queries, the accurate estimation of the key cardinality is critical to the query optimizer for selecting an efficient query plan.

In the prior art, the key cardinality is determined by multiplying the effective cardinality of each individual column in the key to obtain the overall cardinality for the key. The column cardinality represents the number of distinct values for a column. When there are one or more local predicates being applied to the column, the effective column cardinality is the cardinality of the column after the local predicates have been applied. The technique according to the prior art is based on the assumption that all columns in a key are fully independent of each other. Because this assumption does not hold in most cases, the estimated cardinality for the key is still typically a very large number which can cause the query optimizer to choose an unsuitable query plan.

The deficiencies of the prior art technique can be illustrated more thoroughly by an example. In SQL, a grouping request is generated by the "GROUP-BY" clause and duplicate row elimination is generated by the "DISTINCT" clause. The following sample SQL QUERY includes a grouping operation denoted by the GROUP BY clause.

EXAMPLE

SELECT
T3.C4,T3.C5,T3.C6,T4.C3,T4.C4,T2.C2,T2.C3,T2.C4,T2.C5,T2.C6

FROM  CARD.T3 T3, CARD.T4 T4, CARD.T2 T2

-continued

GROUP BY
T3.C4,T3.C5,T3.C6,T4.C3,T4.C4,T2.C2,T2.C3,T2.C4,T2.C5,T2.C6 where: Tn refers to table number "n" and Cm refers to column number "m"

In this example, the actual key cardinality of the grouping columns is 181. The estimated key cardinality determined according to the prior art is 5,832,000, which provides a very poor estimate for the actual value of 181. Because the choice of query plan depends on the accurate estimation of the key cardinality, the estimation of the key cardinality is critical to the performance of a query.

What is needed in the art is a method for accurately estimating key cardinalities.

SUMMARY OF THE INVENTION

The present invention provides a method for estimating cardinalities for query processing in a relational database management system. The present method is suitable for use with a query optimizer for estimating cardinalities for sets of columns or keys resulting from a grouping operation or a duplicate removal operation.

It is an object of the present invention to provide a method for estimating cardinalities that accounts for the effect of local predicates on non-key columns.

It is another object of the present invention to provide a method for estimating cardinalities which determines column equivalence classes and uses the minimum effective column cardinality for the class to estimate the key cardinalities.

It is another object of the present invention to provide a method for estimating effective index key cardinality which accounts for the effect of local predicates on columns in the table.

It is another object of the present invention to produce a better cardinality estimate by utilizing information and attributes which can be obtained from the catalog for the relational database management system. The additional information includes cardinalities for existing unique keys, column equivalence classes, functional dependencies, statistical functional dependencies, and statistically unique keys.

In a first aspect, the present invention provides a method for estimating cardinalities for a key formed from a grouping of columns in a table for use in a query optimizer for a relational database management system, wherein selectivities and keys associated with columns in the table are provided in a catalog, said method comprising the steps of: (a) determining an equivalence class for each column in said key; (b) for each said equivalence class determining an effective cardinality for each of said columns belonging to said equivalence class; (c) determining a cardinality for each of said equivalence classes by choosing the minimum effective cardinality for the columns belonging to said equivalence class; and (d) estimating a cardinality value for said key from the product of said cardinalities for said equivalence classes.

In another aspect, the present invention provides a method for estimating the cardinalities for a key formed from a grouping of columns in a table for use in a query optimizer for a relational database management system, wherein selectivities and index keys are provided in a catalog, said method comprising the steps of: (a) forming one or more partitions from the columns in said grouping, said partition having a plurality of subsets with each said subset comprising a column or a selected index key from the catalog; (b) determining an index key cardinality for each of said subsets; (c) obtaining a cardinality for said partition from the product of the index key cardinalities for each subset belonging to said partition; and (d) obtaining a cardinality value for the grouping of columns by choosing the minimum cardinality from the cardinalities determined for each of said partitions.

In yet another aspect, the present invention provides a method for estimating cardinalities for a key formed from a grouping of columns belonging to a table for use in query optimizer for a relational database management system, wherein selectivities and functional dependencies associated with columns belonging to the table are provided in a catalog, said method comprising the steps of: (a) obtaining functional dependencies for the columns belonging to said grouping; (b) deleting a column which is functionally determined by another column in said grouping; (c) repeating step (b) until all functionally determined columns have been deleted; (d) determining an effective column cardinality for each remaining column; and (e) estimating a cardinality for said grouping of columns from the product of said effective cardinalities.

In another aspect, the present invention provides a method for estimating cardinalities for a key formed from a grouping of columns in a table for use in a query optimizer for a relational database management system, wherein selectivities and keys associated with columns are provided in a catalog, said method comprising the steps of: forming a set of keys comprising said key and other keys selected from said catalog; and obtaining a cardinality for said key by choosing the minimum cardinality value for said keys comprising said set.

In yet a further aspect, the present invention provides a method or estimating cardinalities for a key formed from a grouping of columns in a table for use in a query optimizer for a relational database management system, wherein selectivities and keys, including unique and index keys, associated with columns in the table are provided in a catalog, said method comprising the steps of: (a) forming a set of keys comprising said key and unique keys selected from said catalog; (b) determining an equivalence class for each column belonging to said set; (c) for each said equivalence class determining an effective column cardinality for said class columns belonging to said equivalence class; (d) determining an equivalence class cardinality for each of said equivalence classes by choosing the minimum effective column cardinality for the columns belonging to said equivalence class; (e) forming a combination of columns by choosing a column from each of said equivalence classes; (f) dividing said combination into one or more partitions, each said partition having a plurality of subsets with each said subset comprising a column or a selected index key from said catalog; (g) determining an effective index key cardinality for each of said subsets; (h) obtaining a cardinality for said partition from the product of said effective index key cardinalities for each subset belonging to said partition; (i) determining a cardinality for said combination by choosing the minimum cardinality for said partitions; (j) repeating said steps (e) to (i) for other combinations; (k) obtaining a cardinality value for the key selected in said step (a) by choosing the minimum cardinality of said combinations; (l) repeating said steps (a) to (d) for other keys selected from said catalog; and (k) obtaining a cardinality for said key by choosing the minimum cardinality value determined of all said selected keys.

BRIEF DESCRIPTION OF THE DRAWINGS

Reference will now be made, by way of example, to the accompanying drawings, which show a preferred embodiment of the present invention, and in which.

DETAILED DESCRIPTION OF THE PREFERRED EMBODIMENT

Figure 1:
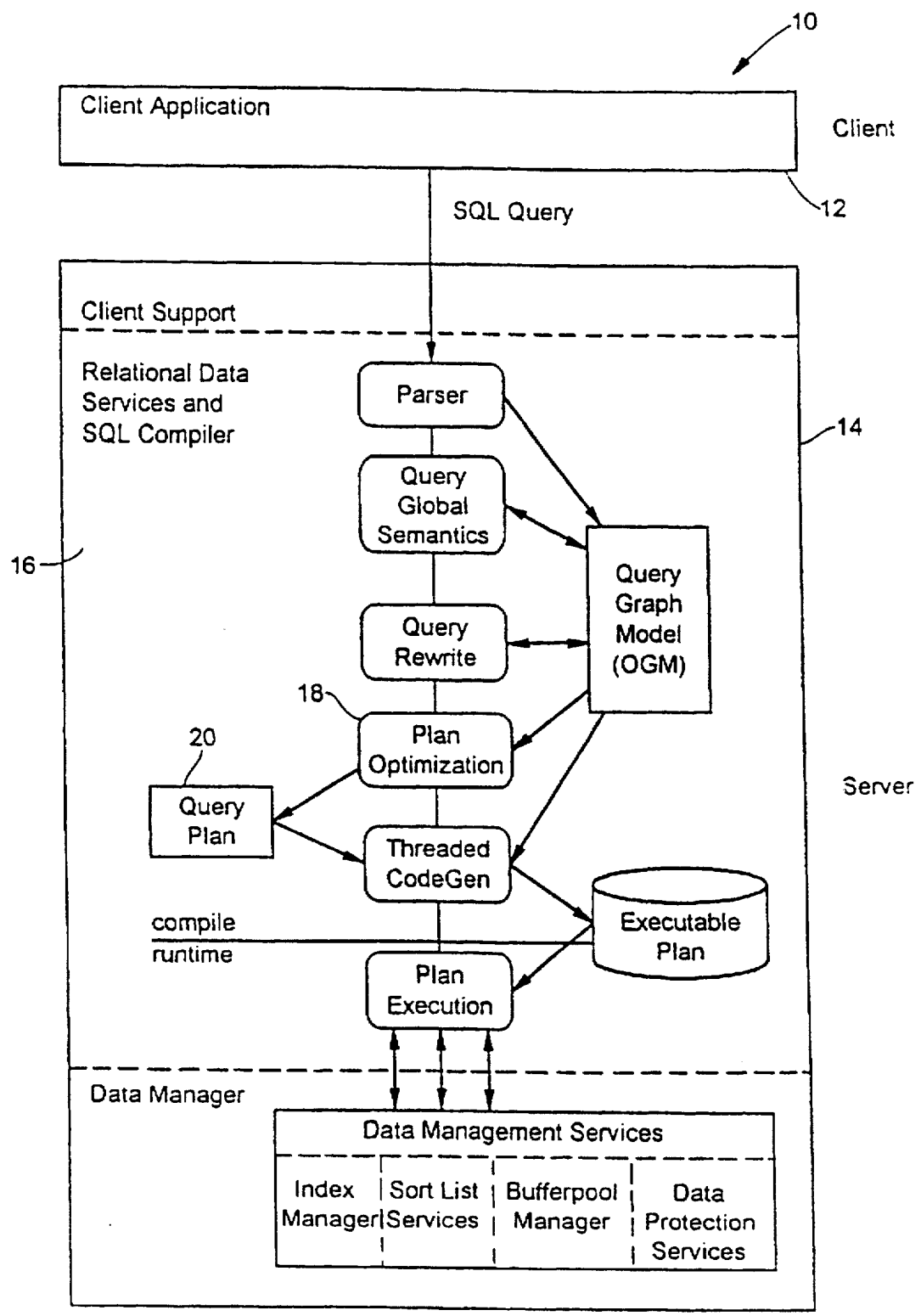
FIG. 1 is a block diagram showing software components of a relational database management system suitable for a method for estimating cardinalities according to the present invention.

Reference is made to FIG. 1 which shows in block diagram form a Relational Database Management System or RDBMS system 10 suitable for use with a method according to the present invention. One skilled in the art will be familiar with how a RDBMS is implemented. Such techniques are straightforward and well known in the art. Briefly, the RDBMS 10 comprises a client application module 12 and a server module 14 as shown in FIG. 1. One of the functions of the server 14 is to process the SQL query entered by the database user. The server 14 comprises a relational data services and SQL compiler 16. The SQL compiler 16 includes a plan optimization module 18 or query optimizer.

The primary function of the query optimizer 18 is to find an access strategy or query plan that would incur or result in minimum processing time and input/output time for retrieving the information requested by the user. In FIG. 1, the query plan is represented by block 20.

Figure 2:
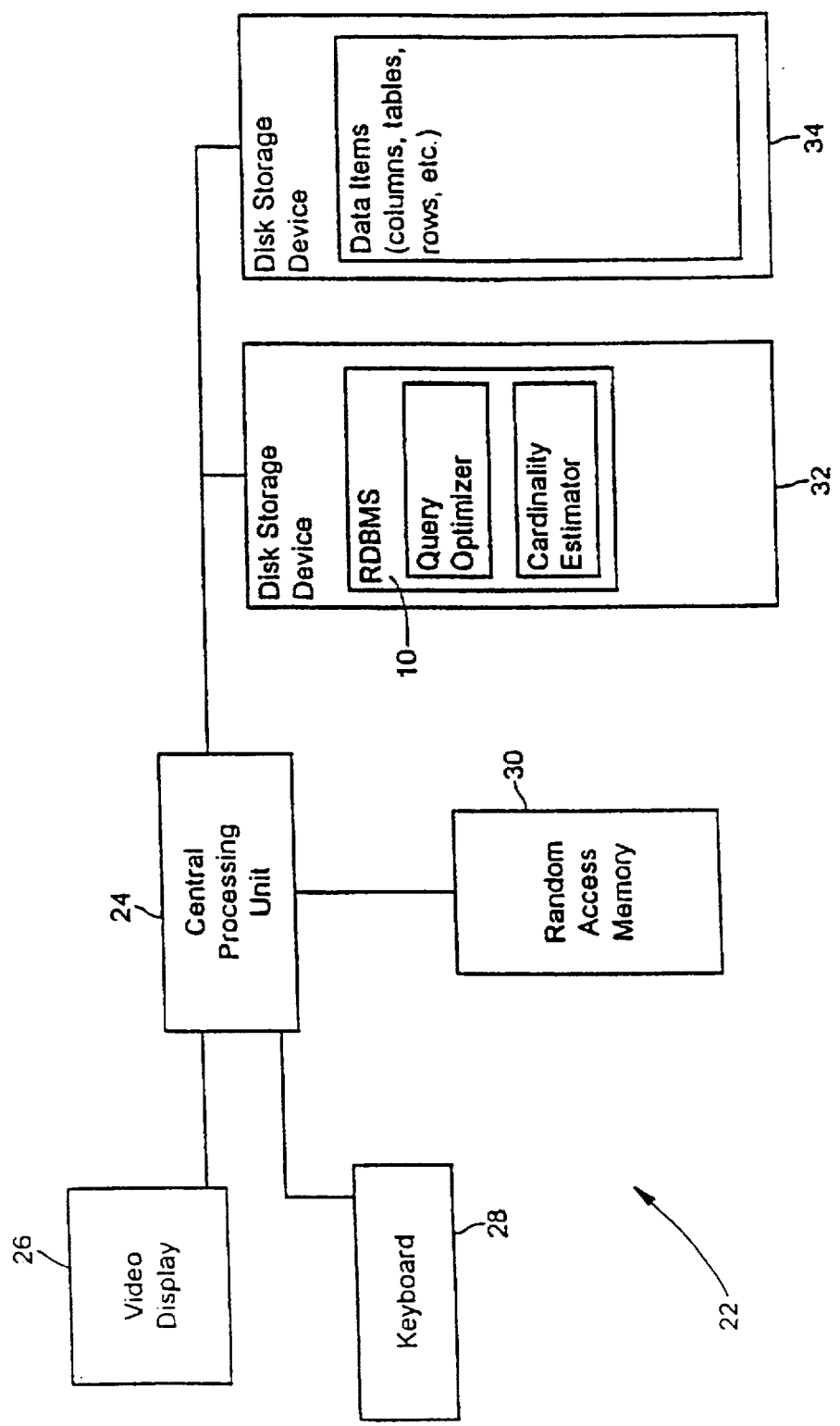
FIG. 2 is a block diagram showing a data processing system employing the present invention.

Reference is next made to FIG. 2 which shows a data processing system 22 incorporating the present invention. The data processing system 22 comprises a central processing unit 24, a video display 26, a keyboard 28, random access memory 30 and one or more disk storage devices 32. One skilled in the art will recognize the data processing system 22 a conventional general purpose digital computer. In FIG. 2, the relational database management system 10 incorporating the present method comprises a software module which is stored or loaded on the disk storage device 32. Data items, e.g. cards, tables, rows, etc. which are associated with the relational database management system 10 can be stored on the same disk 32 or on another disk 34.

In database query processing, the knowledge of resulting cardinalities, i.e. qualifying number of rows associated with the query, is important to the generation of efficient query plans. One important cardinality is the number of rows resulting from a user query which utilizes a grouping operation or a duplicate row removal operation. In the SQL language, the GROUP BY and DISTINCT operations provide grouping. Both operations have the same characteristics, namely, the resulting table will comprise a set of columns in which no two rows share the same value. This set of columns is called a key. If the number of distinct values for the key can be accurately estimated, a key cardinality for the set is obtained. The key cardinality is important to the generation of an efficient query plan, and thus can directly affect the performance of the RDBMS, especially in the case of complex queries.

The present invention provides a method for estimating key cardinalities which can be incorporated into the query optimizer represented by block 18 in FIG. 1. The query optimizer utilizes the key cardinality determined according to the method in selecting an efficient query plan. It will be understood that the present invention is suitable for other database management systems such as the known INFORMIX™ and SYBASE™ systems and not limited to the architecture depicted in FIG. 1.

In the following description, the terms column cardinality and effective column cardinality are used as follows. Column cardinality is the number of distinct values, i.e. rows, for a column. Effective column cardinality is the cardinality of a column after one or more local predicates have been applied to the column. Since duplicate removal (i.e. DISTINCT operation in SQL) is a special case of the grouping operation (i.e. GROUP BY in SQL), the grouping operation in this description will refer to either one of these operations.

The present invention provides a method for estimating the cardinalities for a set of columns or key. The set of columns corresponds to the result produced by a grouping operation or duplicate removal operation in a query. The present method accounts for the effects of local predicates on the set of columns and also the effects of local predicates on other columns in the table but not belonging to the set. The method for estimating cardinalities of column groupings also utilizes selected index key cardinalities which are available in the CATALOG. According to the present method, the effects of local predicates on the index key cardinalities are also taken into account. In order to generate improved and more accurate estimates of key cardinalities, the present method also includes a number of additional operations which utilize other attributes associated with the columns in the table. These attributes include the following:

(1) cardinalities of existing unique keys, (2) column equivalence classes, (3) functional dependencies, (4) statistically unique keys, (5) statistical functional dependencies The sequence and number of processing steps performed will depend on the type and attributes or characteristics of the columns being queried as will be described in more detail below.

The operation of the method for estimating cardinalities according to the present invention is described with reference to the following pseudocode listing.

```
1:  INPUT: a key K comprising columns C for table T
2:  GET functional_dependencies and
    statistical functional_dependencies
3:  GET unique_keys and statistically_unique_keys
    /* from database CATALOG */
4:  STORE unique_keys and statistically_unique_keys and key K in
    set_S
5:  FOR each key k in set_S,
    /* e.g. unique key and statistically unique key */
    DO
6:  FOR all columns in k
7:  DO
8:  IF a column C in k is functionally determined by another column
    in k
9:  THEN delete column C from k
10: DO
11: FIND the column equivalence class for each column in key k
12: FOR each column equivalence class in key k,
    DO
13: determine the effective_cardinality for each column in the
    column equivalence class
    /* using expression (1) */
14: take the minimum effective_cardinality of all column
    cardinalities as the cardinality of this column equivalence class
15: FOR each combination k' in k,
    /* a combination key k' is obtained by choosing a column from
    each column equivalence class determined above */
```

-continued

```
    DO,
16: FIND all partitions of k' based on index key card
    /* a partition of k comprises a set of non intersecting subsets
    of k; and the union of these subsets yields k; and each subset
    comprises one of the following: (a) column, (b) the first two
    keys, (c) the first three keys, (d) the first four keys, or (e)
    the full key of an existing index */
17: FOR each such partition,
    DO
18: FIND effective_cardinality for each subset in the partition
    /* if there are multiple columns use expression (above); if only
    one column use cardinality of column equivalence class */
19: obtain cardinality for partition by multiplying the
    cardinalities for each subset
20: take the minimum cardinality of all partitions as the
    cardinality for this combination k'
21: take the minimum cardinality of all combinations k' as the
    cardinality for this key k
22: take the minimum cardinality of all keys k as the cardinality for
    the key K
23: RETURN (cardinality for key K)
```

The first step in Line 1 of the present method involves inputting the key K comprising columns C in the resulting table T. The columns C comprising the key K are the result of a grouping operation or duplicate removal operation, for example, the "GROUP BY" clause or "DISTINCT" clause in the SQL query language. The present method will produce an estimate for the cardinality of the key K, i.e. key cardinality, for the columns C in the resulting table. The estimated key cardinality is used by the query optimizer 18 (FIG. 1) to generate a query execution plan as will be understood by one skilled in the art.

In Line 2 of the present method, the functional dependencies and the statistical functional dependencies are obtained. A functional dependency is defined as follows: column A functionally determines column B, if for any two rows the columns agree on the value for A, then they also agree on the value for B. Similarly, a set of columns A functionally determines another set of columns B if for any two rows in the table they agree on the values for A and they also agree on the values for B. It follows that the number of distinct values for B is bounded by the number of distinct values for A. Therefore according to the present method, if columns B (or a subset of B) are a grouping key, then the cardinality of B is bounded by the cardinality of columns A. The use of functional dependencies according to the present invention is further shown by the following example.

```
EXAMPLE
SELECT C1, C2, COUNT(*)
FROM T1
WHERE C1 > 100
GROUP BY C2
Assume:
- C1 functionally determines C2,
- cardinalities of C1 and C2 are 1000 and 1000 respectively
- the selectivity for C1 is 1%
THEN
- the effective column cardinality of C1 is 1000 * 1% = 10
- according to the present method, the cardinality of C2 is
  estimated to be 10 (the cardinality of C2 is bounded by the
  cardinality of C1 because C1 functionally determines C2)
```

For the above example, the prior art method would estimate the key cardinality as 1000, i.e. |C2|=1000 which is considerably larger than the value according to the present method.

One skilled in the art will be familiar with how to obtain the functional dependencies from the optimizer module and therefore additional pseudocode for this operation in Line 2 is not provided.

Statistical functional dependencies are also obtained in Line 2 and are used by the present method to estimate key cardinalities. A column is a statistically unique key if the cardinality of the column is very close, i.e. 95%, to the cardinality of the table. This also means that the column statistically functionally determines all the columns of the table. The utilization of statistical functional dependencies by the present method is shown using the following example SQL QUERY.

```
EXAMPLE
SELECT T1.C1, T1.C3
FROM T1,T2
WHERE C3 < 10
GROUP BY T1.C1, T1.C3
Assume:
- cardinality of table T1, columns T1.C1, T1.C3 are 2000, 100 and
  1950 respectively
- selectivity, i.e. ff_3, for the predicate on C3 is 1%
THEN according to the invention,
- T1.C3 is a statistically unique key in table T1 (i.e. 2000 ≅ 1950)
  and T1.C3 statistically functionally determines T1.C1
- the present method drops T1.C1 from the grouping key when
  considering key cardinality and the cardinality is estimated as
  |C3| * ff_3 =
      1950 * 1% = 19.5
```

The prior art method estimates the cardinality for above example as |C1|*|C2|*ff_3=100*1950*1%=1950 which is a clearly inaccurate estimate.

The statistical functional dependencies can be determined in Line 2 from information contained in the CATALOG for the relational database management system and accessing the CATALOG will be apparent to one skilled in the art.

In Line 3, the present method determines the unique keys and statistically unique keys associated with the table T and forms a set S in Line 4. The set S comprises the unique keys, the statistically unique keys and the key K.

The unique keys can be determined from the CATALOG as will be within the understanding of one skilled in this art. According to the invention, a unique key is formed from a set of columns in a table where no two rows contain the same value for these columns. As will be described, the present method determines the minimum cardinality of all the unique keys in the table and uses this as the cardinality for the grouping key. This follows because if the table cardinality is bounded by any unique key cardinality, then the cardinality of any grouping key should also be bounded by the unique key cardinality. The following example QUERY further describes this operation.

```
EXAMPLE
SELECT C1,C2,C3
FROM T1, T2
WHERE C4=10
GROUP BY C1,C2,C3
Assume:
- cardinalities for C1,C2,C3 are 10,20 and 3000 respectively
- (C1,C2,C4) is a unique key with full key cardinality 600000
Then according to the present method
- the cardinality of C1,C2,C4 is determined as 10*20*1 = 200 since C4
  is bounded by the predicate 10)
- further because C1,C2,C4 is a unique key, the present method bounds
  the cardinality of the grouping key C1,C2,C3 by 200
- and the cardinality for C1,C2,C3 is estimated as 200
```

In the above example, the method according to the prior art would estimate the cardinality to be 10*20*3000= 600000. This represents a very poor estimate when compared to the estimated value of 200 generated according the present method.

The statistically unique keys are also derived from information which is in the CATALOG. According to the present method, a statistically unique key comprises a column (or set of columns) which has a cardinality that is very close, i.e. 95%, to the cardinality of the table. (If the cardinality of a column is identical to the cardinality of the table T, then the column is a unique key.) The utilization of a statistically unique key according to the present invention can be further described by the following example SQL QUERY.

```
EXAMPLE
SELECT C1
FROM T1
WHERE C2 < 10
GROUP BY C1
Assume
 - cardinality of table T1, column C1, C2 are 2000, 1000 and 1998
 - selectivity of predicate on C2 is 1%
Then according to the present method
 - since cardinality of C2 (i.e. |C2|) is very close to |T1|, C2 is a
   is a statistically unique key
 - and the present method estimates the cardinality of C1 as
   min (|C1|, |C2|_f_2) = min (1000, 2000 * 1%) = 20
```

The method for estimating cardinalities according to the prior art would have produced an estimate of 1000. Once again the prior art method provides an inaccurate estimate which can cause the query optimizer 18 (FIG. 1) to pick a wrong or inefficient query plan.

Database systems typically contain many tables which include undeclared unique keys, for example, the TPCD database has the CNAME column in the CUSTOMERS table which is an undeclared unique key. The method according to the invention exploits this and other information to generate an accurate estimate of the key cardinality. Although approximate uniqueness can be estimated throughout the query optimization process, it is preferable to derive the statistically unique keys based on base table catalog statistics. The determination of statistically unique keys will be apparent to one skilled in the art and therefore pseudocode for this operation in Line 3 is not provided.

Starting at Line 5, the present method involves performing a number of operations for each key k in set S. In Lines 6 to 9, the method involves finding and deleting any columns C which are functionally determined by other columns in set K. This operation is repeated until all the functionally determined columns have been deleted. After the operation in Lines 6 to 9, set S comprises the keys, i.e. unique keys, statistically unique keys and key K, with the functionally determined columns deleted. The method uses set S to estimate the key cardinality for the table T. The remaining steps as will now be described involve using the "keys" in set S and other information to produce an accurate estimate for the cardinality of key K.

For each key k in set S, the column equivalence class is determined in Line 11. If two columns functionally determine each other, then they belong to the same column equivalence class. The column equivalence class represents a grouping of columns which are equivalent. Assuming columns C1 and C2 belong to the same column equivalence class, then according to the present method, the cardinality of C1 is bounded by the cardinality of C2, and the cardinality of C2 is bounded by the cardinality of C1. Furthermore, the cardinality of either columns is bounded by the minimum effective cardinalities of C1 and C2. In a RDBMS, equivalence columns are typically generated by join predicates, e.g. the predicate (C1 join C2) would result in columns C1 and C2 belonging to the same column equivalence class.

The utilization of column equivalence classes by the method according to the present invention is further described by the example QUERY which follows.

```
EXAMPLE
SELECT T1.C1
FROM T1, T2
WHERE T1.C1 = T2.C1
GROUP BY T1.C1
Assume
 - cardinality of T1.C1 is 10000
 - cardinality of T2.C1 is 10
Then
 - due to the join predicate, columns T1.C1 and T2.C1 are equivalent
 - and according to the present method, the cardinality of T1.C1 is
   bounded by cardinality of T2.C1 and vice versa and the cardinality
   is estimated to be 10
```

The method according to the prior art would estimate the cardinality for the above example as 10,000 which provides an inaccurate estimate.

Once the column equivalence classes have been obtained for each column in key k, the effective minimum cardinality for each column in the column equivalence class is determined as indicated in Lines 12 to 13.

To determine the effective cardinality of a column in Line 13, the method according to the present invention considers the effect of local predicates on other columns in the equivalence class. Known query optimizers estimate the cardinality of a column C1 using only the product of predicate selectivity (ff_1) and base table column cardinality |C1| obtained from the CATALOG. Known optimizers do not consider the effects of predicates on other columns. According to the invention, the effective cardinality of a column is determined by the following expression which will be referred to as Expression (1):

$$\text{EFFECTIVE COLUMN CARDINALITY} = |C1| * f\_1 * (1 - (1 - f\_2)^{(|T|*|C1|)}) \quad (1)$$

where:

|T| is the table cardinality, i.e. number of rows in table

|C1| is the base table cardinality obtained from the CATALOG ff_1 is the selectivity of a local predicate for column C1 ff_2 is the selectively of a local predicate for column C2

In the derivation of Expression (1) according to the present method, it is assumed that C1 and C2 are independent, and the values of C1 and C2 are both uniformly distributed in the table.

If there is no restriction on column C2, i.e. ff_2 is 1, Expression (1) reduces to |C1|*ff_1 which provides the basic operation performed by known optimizers for obtaining the effective cardinality of a column. Since the prior art method is based on the assumption that all columns in a key are fully independent of each other, the method according to the prior art usually leads to unnecessarily large numbers for the key cardinalities. This in turn can result in the query optimizer 18 (FIG. 1) picking the wrong query plan which is clearly undesirable.

The operation (and improved results) of Expression (1) according to the present invention for estimating the effective cardinality can be described by way of the following example QUERY:

```
_ EXAMPLE
SELECT C1
FROM T
WHERE C1 > 100 and C2 < 10
```

-continued

GROUP BY C1
Assume:
- cardinality of C1 is 20000
- selectivity ff__1 of predicate on C1 > 100 is 90%
- selectivity ff__2 of predicate on C2 < 10 is 1%
- cardinality of table T is 40000
Then according to the invention,
- the effective cardinality of grouping key C1 is determined according
to Expression (1)
|C1| * ff__1 (1 - (1 - ff__2)$^{(|T|*|C1|)}$)
= 20,000 * 0.90 * (1 - (1 - 0.01)$^{(40000/20000)}$)
= 358

For the above example, the method according to the prior art would estimate the effective cardinality of the column to be 18000 (i.e. |C1|*ff__1=20000*90%). It can be seen that the method according to the invention provides a much better estimate when compared to the prior art approach.

To determine the effective cardinality of a set of columns (denoted by C), the Expression (1) is generalized as follows and denoted as Expression (2):

$$|C'|=|C|*ff\_C*(1-(1-ff_{not\ C})^{(|T|/|C|)}) \qquad (2)$$

where:

|C| is the product of base table column cardinalities for the group

|T| is the table cardinality ff__C is the selectivity for C, which is the product of selectivities of all columns in C ff$_{notC}$ is the selectivity for all columns in the table not belonging to C Expression (2) reduces to |C'|=|C|*ff__C if there are no local predicates on columns outside of C, i.e. ff$_{notC}$ is 1.

Once the effective cardinality for each column in the equivalence class has been determined (i.e. using Expression (1)), then, in Line 14, the minimum effective cardinality of all column cardinalities is taken as the cardinality for the column equivalence class. As described above, the cardinality of the columns comprising an equivalence class is bounded by the minimum effective cardinality of all column cardinalities.

In Line 15, the present method forms a combination k' by choosing a column from each column equivalence class (as determined above). In Line 16, the combination k' is then divided into one or more partitions based on index key cardinalities. A partition comprises a set of non-intersecting subsets of k and the union of these subsets produces k. A subset can comprise a column or one of the index key cardinalities. The subsets are used to determine the cardinality of the partition as will be described below.

The index key cardinality is another key which is utilized by the present method. As described above, partitions are formed in Line 16 on the basis of index key cardinalities as part of the process for estimating key cardinalities according to the invention. Indexing is a facility provided by the RDBMS for providing access to a table. An index is defined as a set of index entries for a particular table. An index entry corresponds to one row in the table and each entry comprises two parts: an index key and a tuple identifier. The index key comprises a sequence of columns in the row which are associated with the index. The tuple identifier identifies the position in the DASD, e.g. disk, that contains the row.

In most database systems various types of statistics are collected for an index and these can be accessed in the CATALOG for the database. The index key cardinality is one such statistic utilized by the present method. Because the sequence or ordering of index key columns is significant, only cardinality counts for sets of columns that form a prefix for an entire index key are available in the CATALOG. For example, the number of unique values in the first column of the index is the first key cardinality, the number of unique values in the first two columns of the index is the second key cardinality and so on until the entire index key corresponds to the full key cardinality.

The method according to the present invention uses index key information when a query references the same columns as in the index key. The utilization of the index key according to the present method is described in more detail with reference to the following example SQL QUERY.

EXAMPLE
SELECT C2,C3,C4,C5,C6
FROM T2
GROUP BY C2,C3,C4,C5,C6
Assume
- table T2 has a cardinality of 80000000
- cardinalities for C2,C3,C4,C5 and C6 are 20,30,40,50 and 60
- there is an index cardinality of 100 on (C2,C3,C4,C5,C6)
Then,
- the present method determines if the columns in the query correspond
to a pre-existing index key
- since there is a correspondence, the present method accurately
estimates the key cardinality as 100

For the above example, the prior art method would estimate the cardinality as 72000000 (i.e. 20*30*40*50*60). The present method produces a much more accurate estimate of 100 by determining if a pre-existing index key cardinality can be used and then deriving the estimate from the index key cardinality.

Referring back to Line 16 of the pseudocode listing, a subset for partition corresponds to an index key or column and comprises either a column, the first two key cardinality, the first three key cardinality, the first four key cardinality or the full key cardinality. It will be understood that the definition of a subset will depend on the index keys which can be determined. Once all the subsets (and partitions) have been determined, the next operation, in Lines 17 to 18, involves finding the effective key cardinality for each subset in the partition.

The effective index key cardinality determined according to the present method considers the effect of local predicates on the index key cardinality. According to the invention, the effective index key cardinality is obtained using the following expression:

$$|K'|=|K|*ff\_K*(1-(1-ff_{notK})^{(|T|/|K|)}) \qquad (3)$$

where:

K is the first "n" key of an index, where n can be 1 to the number of columns in the index

|K| is the first "n" key cardinality obtained from the catalog

|T| is the table cardinality ff__K is the product of selectivities of local predicates on columns in K.

ff$_{notK}$ is the product of selectivities of local predicates on columns in the table not belonging to K In the above expression, the "n" index key cardinality can be taken as the cardinality for K because the product of column cardinalities will be no less than the "n" index key cardinality and the latter value is the more accurate one. The operation of Expression (3) according to the present invention can be illustrated by the following example SQL

QUERY:

---

EXAMPLE
SELECT C1,C2
FROM T1
WHERE C1 > 10 AND C2 > 200 AND C2 > 100
GROUP BY C1,C2
Assume
- cardinalities for C1,C2,C3 are 100,200 and 300 respectively
- selectivities for predicated on C1,C2,C3 are 80%, 90% and 1% respectively
- cardinality of the first two key index of an index (C1,C2,C4,C5) is 8000
- cardinality of table T1 is 40000
Then according to the present method,
- Expression (3) is used compute an estimate for cardinality $$|K|' = |K| * ff\_K * (1 - (1 - ff_{boxK})^{(|T|*|K|')})$$  (2)
$$= 8000 * 80\% * 90\% * (1 - (1 - 1\%)^{(40000/8000)})$$
$$= 282$$

which produces the correct estimate of 282

---

The approach taken by the prior art method would simply estimate the cardinality as $(C1*ff\_1)*(C2*ff\_2) = 100*80\%*200*90\%$ to produce a value of 14400. The prior art method fails to consider the effects of predicates on the non-key column C3 nor does it utilize the index key cardinality. As can be seen, the resulting cardinality of 14400 is a very poor estimate.

Once the effective cardinalities for each subset have been determined in Line 18, the cardinality for the partition is obtained by multiplying, in Line 19, the cardinalities for each of the subsets. Because the subsets are independent, the cardinality for a partition is determined by the product of the cardinalities for the subsets.

In Line 20, the cardinality for the combination k' is determined by selecting the minimum cardinality for all partitions belonging to the combination k'. This follows because the cardinality of combination k' is bounded by the cardinality of the partition. Similarly, in Line 21, the cardinality for the key k is determined from the minimum cardinality for all the combinations k' and in Line 22 minimum cardinality of the all the keys k is the estimated cardinality for the key K, i.e. grouping of columns produced by GROUP BY or DISTINCT operation in SQL for example.

It will be understood that the techniques embodied in the present method as described above can be employed in any sequence and that according to the invention any subset of the techniques can also be applied.

The operation of the present method will now be described with respect to the SQL sample query which was shown above.

---

EXAMPLE
SELECT T3.C4,T3.C5,T3.C6,T4.C3,T4.C4,T2.C2,T2,C3,T2.C4, T2.C5,T2.C6
FROM
CARD.T3 T3, CARD.T4 T4, CARD.T2 T2
GROUP BY
T3.C4,T3.C5,T3.C6, T4.C3,T4.C4, T2.C2,T2.C3,T2.C4,T2.C5,T2.C6
The following information is also available from the RDBMS:
- full key cardinality for index T4(C2,C3,C4,C5) is 25
individual column cardinalities for T4.C3 and T4.C4 are 3 and 2 respectively
- full key cardinality for index T3(C4,C5,C6) is 6 individual column cardinalities for T3.C4, T3.C5, T3.C6 are 6, 5 and 6 respectively
- full key cardinality for index T2(C2,C3,C4,C5,C6) is 6 column cardinalities for C2,C3,C4,C5,C6 are 5, 6, 6, 5, and 6 respectively

---

For the first sub-group in the GROUP BY clause, i.e. (T3.C4, T3.C5, T3.C6), the full index cardinality is known to be 6, and the product of the individual column cardinalities is 6*5*6 which gives 180. The present method compares the full index cardinality to the product of individual column cardinalities and determines the cardinality for this sub-group to be 6. For the second sub-group in the GROUP BY operation, i.e. (T4.C3, T4.C4), the index cardinality is estimated as 25 from the full index cardinality and the product of the individual column cardinalities is 2*3. From this information, the method according to the present invention estimates the cardinality for the second sub-group as 6. For the third sub-group comprising the columns (T2.C2, T2.C3,T2.C4,T2.C5,T2.C6), the cardinality for the sub-group is estimated from the full index cardinality as 6 and from the product of the individual column cardinalities as 5400 (5*6*6*5*6). According to the present method, the cardinality for the sub-group is determined as 6. The cardinality for the grouping is determined from the product of cardinalities for each sub-group as determined above, i.e. 6*6*6. Following the above steps, the method according to the present invention estimates the key cardinality to be 216. The actual key cardinality is 181, while the cardinality estimated according to the prior art would be 5,832,000. It can be seen that the method according to the invention provides a significant improvement over the prior art.

The present invention may be embodied in other specific forms without departing from its spirit or essential characteristics. The embodiments of the present invention described above are to be considered in all respects only as illustrative and not restrictive in scope. The scope of the invention is, therefore, indicated by the appended claims rather than by the detailed description above. Therefore, all changes which come within the meaning and range of equivalency of the claims are to be considered embraced within their scope.

What is claimed:

1. A method for estimating cardinalities for a key formed from a grouping of columns in a table for use in a query optimizer for a relational database management system, wherein selectivities and keys associated with columns in the table are provided in a catalog, said method comprising the steps of:

(a) determining an equivalence class for each column in said key;

(b) for each said equivalence class determining an effective column cardinality for each of said columns belonging to said equivalence class;

(c) determining a cardinality for each of said equivalence classes by choosing the minimum effective cardinality for the columns belonging to said equivalence class; and (d) estimating a cardinality value for said key from the product of said cardinalities for all said equivalence classes.

2. The method for estimating cardinalities for a key as recited in claim 1, wherein said effective column cardinality is determined according to the expression:

$$|C1|*ff\_1$$

where:

|C1| is the base column cardinality ff_1 is the selectivity of a local predicate on the column C1.

3. The method for estimating cardinalities for a key as recited in claim 1, wherein step (a) comprises forming a set of keys from said key and other keys selected from said catalog and determining an equivalence class for each column belonging to said set.

4. The method for estimating cardinalities for a key as recited in claim 1, further including following said step (a) and before said step (b) the steps of:

obtaining functional dependencies for columns belonging to said grouping;

deleting a column which is functionally determined by another column, and repeating said step until all functionally determined columns have been deleted.

5. The method for estimating cardinalities for a key as recited in claim 4, wherein said functional dependencies include statistical functional dependencies.

6. The method for estimating cardinalities for a key as recited in claim 1, wherein said effective column cardinality is determined according to the expression:

$$|C1|*ff\_1*(1-(1-ff\_C)^{(|T|/|C1|)})$$

where:

|T| is the base table cardinality,

|C1| is the base column cardinality, ff\_ is the selectivity of a local predicate on the column C1, and ff\_C is the product of the selectivities of local predicates on other columns belonging to said equivalence class.

7. A method for estimating cardinalities for a key formed from a grouping of columns in a table for use in a query optimizer for a relational database management system, wherein selectivities and index keys are provided in a catalog, said method comprising the steps of:

(a) forming one or more partitions from the columns in said grouping, said partition having a plurality of subsets with each of said subsets comprising a column or an index key;

(b) determining an index key cardinality for each of said subsets;

(c) obtaining a cardinality for said partition from the product of the index key cardinalities for each subset belonging to said partition; and (d) obtaining a cardinality value for the grouping of columns by choosing the minimum cardinality from the cardinalities determined for each of said partitions.

8. The method for estimating cardinalities for a key as recited in claim 7, wherein said index key cardinality in said step (b) is determined according to the expression:

$$|K|*ff\_K*(1-(1-ff_{notC})^{(|T|/|K|)})$$

where:

K is the first n key of an index and n can be 1 to the number of columns in the index,

|T| is the base table cardinality,

|K| is the first n index key cardinality, ff\_K is the product of selectivities of local predicates on columns in K, and $ff_{notC}$ is the product of selectivities of local predicates on columns in the table but not in K.

9. A method for estimating cardinalities for a key formed from a grouping of columns belonging to a table for use in query optimizer for a relational database management system, wherein selectivities and functional dependencies associated with columns belonging to the table are provided in a catalog, said method comprising the steps of:

(a) obtaining functional dependencies for the columns belonging to said key;

(b) deleting a column which is functionally determined by another column in said key;

(c) repeating step (b) until all functionally determined columns have been deleted;

(d) determining an effective column cardinality for each remaining column; and (e) estimating a cardinality for said key from the product of said effective cardinalities.

10. The method for estimating cardinalities as recited in claim 9, wherein said effective column cardinality is determined according to the expression:

$$|C1|*ff\_1*(1-(1-ff\_C)^{(|T|/|C1|)})$$

where:

|T| is the base table cardinality,

|C1| is the base column cardinality, ff\_1 is the selectivity of a local predicate on the column C1, and ff\_C is the product of the selectivities of local predicates on the other remaining columns.

11. A method for estimating cardinalities for a key formed from a grouping of columns in a table for use in a query optimizer for a relational database management system, wherein selectivities and unique keys and index keys are provided in a catalog, said method comprising the steps of:

(a) forming a set of keys comprising said key and selected unique keys;

(b) determining an equivalence class for each column belonging to said set;

(c) for each said equivalence class determining an effective column cardinality for each of said columns belonging to said equivalence class;

(d) determining an equivalence class cardinality for each of said equivalence classes by choosing the minimum effective column cardinality for the columns belonging to said equivalence class;

(e) forming a combination of columns by choosing a column from each of said equivalence classes;

(f) dividing said combination into one or more partitions, each said partition having a plurality of subsets with each said subset comprising a column or a selected index key from said catalog;

(g) determining an effective index key cardinality for each of said subsets;

(h) obtaining a cardinality for said partition from the product of said effective index key cardinalities for each subset belonging to said partition;

(i) determining a cardinality for said combination by choosing the minimum cardinality for said partitions;

(j) repeating said steps (e) to (i) for other combinations;

(k) obtaining a cardinality value for said set formed in said step (a) by choosing the minimum cardinality of all said combinations;

(l) repeating said steps (a) to (d) for other keys selected from said catalog; and (m) obtaining a key cardinality for the grouping of columns by choosing the minimum cardinality value of all said selected keys.

12. The method for estimating cardinalities as recited in claim 11, wherein said effective column cardinality is determined according to the expression:

$$|C1|*ff\_1*(1-(1-ff\_C)^{(|T|/|C1|)})$$

where:

|T| is the base table cardinality,

|C1| is the base column cardinality, ff_1 is the selectivity of a local predicate on the column C1, and ff_C is the product of the selectivities of local predicates on other columns belonging to said equivalence class.

13. The method for estimating cardinalities for a key as recited in claim 12, wherein said effective index key cardinality is determined according to the expression:

$$|K|*ff\_K*(1-(1-ff_{norC})^{(|T|/|K|)})$$

where:

|T| is the base table cardinality,

|K| is the first n key cardinality of an index, where n is 1 to number of columns in the index; and cardinality is the first n key cardinality obtained from the catalog ff_K is the product of selectivities of local predicates on columns in index key, and $ff_{norC}$ is the product of selectivities of local predicates on columns not belonging in index key.

14. The method for estimating cardinalities for a key as recited in claim 11, further including following said step (a) and before said step (b) the step of:

obtaining functional dependencies for columns belonging to said grouping;

deleting a column which is functionally determined by another column, and repeating said step until all functionally determined columns have been deleted.

15. A relational database management system for use with a computer system wherein queries are entered for retrieving data from tables and wherein said system includes a catalog for providing selectivities and keys associated with columns in the tables, said system comprising:

means for processing queries;

means for optimizing said queries and generating a plurality of query plans;

said means for optimizing having means for estimating cardinalities for a key for said query plans and means for selecting one of said query plans for execution using said estimated cardinalities;

said means for estimating cardinalities including, (a) means for determining an equivalence class for columns belonging to said key;

(c) means for determining an effective cardinality for each column belonging to said equivalence classes;

(d) means for choosing the minimum effective cardinality for the columns belonging to each said equivalence class;

(e) means for generating a cardinality value for said key from the product of the minimum effective cardinality for each of said equivalence classes; and (f) said means for selecting being responsive to said key cardinality value for choosing a query plan for execution.

16. The system as recited in claim 15, wherein said means for determining an effective column cardinality includes means for executing the expression:

$$|C1|*ff\_1*(1-(1-ff\_C)^{(|T|/|C1|)})$$

where:

|T| is the base table cardinality,

|C1| is the base column cardinality, ff_1 is the selectivity of a local predicate on the column C1, and ff_C is the product of the selectivities of local predicates on other columns belonging to said equivalence class.

17. A relational database management system for use with a computer system wherein queries are entered for retrieving data from tables and wherein said system includes a catalog for providing selectivities and keys and index keys associated with columns in the tables, said system comprising:

means for processing queries;

means for optimizing said queries and generating a plurality of query plans;

said means for optimizing having means for estimating cardinalities for a key for said query plans and means for selecting one of said query plans for execution using said estimated cardinalities;

said means for estimating cardinalities including, (a) means for forming a partition from the columns in said key, said partition having a plurality of subsets with each said subset comprising a column or a selected index key;

(b) means for determining an index key cardinality for each of said subsets;

(c) means for obtaining a cardinality for said partition from the product of the index key cardinalities for each subset belonging to said partition;

(d) means for generating a cardinality value for the grouping of columns by choosing the minimum cardinality from the cardinalities determined for each of said partitions; and (e) said means for selecting being responsive to said key cardinality value for choosing a query plan for execution.

18. The system as recited in claim 17, wherein said means for determining an index key cardinality includes means for executing the expression:

$$|K|*ff\_K*(1-(1-ff_{norC})^{(|T|/|K|)})$$

where:

K is the first n key of an index and n can be 1 to the number of columns in the index,

|T| is the base table cardinality,

|K| is the first n index key cardinality, ff_K is the product of selectivities of local predicates on columns in index key; and $ff_{norC}$ is the product of selectivities of local predicates on columns in the table but not in K.

19. A method for estimating cardinalities for a key formed from a grouping of columns in a table for use in query optimizer for a relational database management system, wherein information associated with columns in the table are provided in a catalog, said method comprising the steps of:

obtaining functional dependencies for columns belonging to said grouping of columns;

deleting a column which is functionally determined by another column, and repeating said step until all functionally determined columns have been deleted;

determining an effective columns cardinality for each of said remaining columns; and obtaining a cardinality value for the grouping of columns by choosing the minimum cardinality from the cardinalities determined for each of said remaining columns.

20. The method for estimating cardinalities as recited in claim 19, wherein said effective column cardinality is determined according to the expression:

$$|C1|*ff\_1*(1-(1-ff\_C)^{(|T|/|C1|)})$$

where:

|T| is the base table cardinality,

|C1| is the base column cardinality, ff_1 is the selectivity of a local predicate on the column C1, and ff_C is the product of the selectivities of local predicates on the remaining columns.

21. The method as recited in claim 20, wherein said functional dependencies include statistical functional dependencies.

22. The method as recited in claim 19, wherein said functional dependencies include statistical functional dependencies.

23. A method for estimating cardinalities for a key formed from a grouping of columns in a table for use in a query optimizer for a relational database management system, wherein selectivities and unique keys associated with columns are provided in a catalog, said method comprising the steps of:

forming a set of keys from said key and unique keys selected from said catalog; and obtaining a cardinality for said key by choosing the minimum cardinality value for said keys comprising said set.

24. A computer program product for use on a computer wherein queries are entered for retrieving data from a database having a catalog for providing selectivities and keys and index keys, said computer program product comprising:

a recording medium;

means recorded on said medium for instructing said computer to perform the steps of,
  (a) forming a grouping of columns;
  (b) determining an equivalence class for each column in said grouping;
  (c) for each said equivalence class determining an effective cardinality for each of said columns belonging to said equivalence class;
  (d) determining a cardinality for each of said equivalence classes by choosing the minimum effective cardinality for the columns belonging to said equivalence class; and
  (e) estimating a cardinality value for said grouping of columns from the product of said cardinalities for all said equivalence classes.

25. A computer program product for use on a computer wherein queries are entered for retrieving data from a database having a catalog for providing selectivities and keys and index keys, said computer program product comprising:

a recording medium;

means recorded on said medium for instructing said computer to perform the steps of,
  (a) forming a grouping of columns;
  (b) forming one or more partitions from columns in said grouping, said partition having a plurality of subsets with each said subset comprising a column or a selected index key;
  (c) determining an index key cardinality for each of said subsets;
  (d) obtaining a cardinality for said partition from the product of the effective index key cardinalities for each subset belonging to said partition; and
  (e) obtaining a cardinality value for the grouping of columns by choosing the minimum cardinality from the cardinalities determined for each of said partitions.

26. A database system for retrieving data stored in tables having columns and rows and including a catalog for providing selectivities and keys associated with data stored in said tables, said system comprising:

a computer having storage means for storing said data and means for entering queries for retrieving data from said tables;

means for processing said queries;

said means for processing including means for optimizing said queries and generating a plurality of query plans;

said means for optimizing having means for estimating cardinalities for a key for said query plans and means for selecting one of said query plans for execution using said estimated cardinalities;

said means for estimating cardinalities including,
  (a) means for determining an equivalence class for columns belonging to said key;
  (b) means for determining an effective cardinality for each column belonging to said equivalence classes;
  (c) means for choosing the minimum effective cardinality for the columns belonging to each said equivalence class;
  (d) means for generating a cardinality value for said key from the product of the minimum effective cardinality for each of said equivalence classes; and
  (e) said means for selecting being responsive to said key cardinality value for choosing a query plan for execution.

27. The system as recited in claim 26, wherein said means for determining an effective cardinality includes means for executing the expression:

$$|C1|*ff\_1*(1-(1-ff\_C)^{(|T|/|C1|)})$$

where:

|T| is the base table cardinality,

|C1| is the base column cardinality, ff_1 is the selectivity of a local predicate on the column C1, and ff_C is the product of the selectivities of local predicates on other columns belonging to said equivalence class.

28. The system as recited in claim 26, further including means for obtaining functional dependencies for columns belonging to said key and means for deleting a column which is functionally determined by another column.

29. A database system for retrieving data stored in tables having columns and rows and including a catalog for providing selectivities and keys and index keys associated with said data, said system comprising:

a computer having storage means for storing said data and means for entering queries for retrieving data from said tables;

means for processing said queries;

said means for processing including means for optimizing said queries and generating a plurality of query plans;

said means for optimizing having means for estimating cardinalities for a key for said query plans and means for selecting one of said query plans for execution using said estimated cardinalities;

said means for estimating cardinalities including,
  (a) means for forming a partition from the columns in said key, said partition having a plurality of subsets with each said subset comprising a column or a selected index key;
  (b) means for determining an index key cardinality for each of said subsets;

(c) means for obtaining a cardinality for said partition from the product of the index key cardinalities for each subset belonging to said partition;

(d) means for generating a cardinality value for the grouping of columns by choosing the minimum cardinality from the cardinalities determined for each of said partitions; and (e) said means for selecting being responsive to said key cardinality value for choosing a query plan for execution.

30. The system as recited in claim 29, wherein said means for determining an index key cardinality includes means for executing the expression:

$$|K|*ff\_K*(1-(1-ff_{norC})^{(|T|/|K|)})$$

where:

K is the first n key of an index and n can be 1 to the number of columns in the index,

|T| is the base table cardinality,

|K| is the first n index key cardinality, ff_K is the product of selectivities of local predicates on columns in index key, and ff_{norC} is the product of selectivities of local predicates on columns in the table but not in K.

31. The system as recited in claim 29, further including means for obtaining functional dependencies for columns belonging to said key and means for deleting a column which is functionally determined by another column.

32. A computer program product for use on a computer wherein queries are entered for retrieving data from a database having a catalog for providing selectivities and keys, said computer program product comprising:

a recording medium;

means recorded on said medium for instructing said computer to perform the steps of, (a) forming a grouping of columns;

(b) obtaining functional dependencies for the columns belonging to said key;

(c) deleting a column which is functionally determined by another column in said key;

(d) repeating step (c) until all functionally determined columns have been deleted;

(e) determining an effective column cardinality for each remaining column; and (e) estimating a cardinality for said key from the product of said effective cardinalities.

33. A computer program product for use on a computer wherein queries are entered for retrieving data from a database having a catalog for providing information associated with columns in a table, said computer program product comprising:

a recording medium;

means recorded on said medium for instructing said computer to perform the steps of, (a) forming a grouping of columns;

(b) obtaining functional dependencies for columns belonging to said grouping of columns;

(c) deleting a column which is functionally determined by another column, and repeating said step until all functionally determined items have been deleted;

(d) determining an effective columns cardinality for each of said remaining columns; and (e) obtaining a cardinality value for the grouping of columns by choosing the minimum cardinality from the cardinalities determined for each of said remaining columns.

34. A computer program product for use on a computer wherein queries are entered for retrieving data from a database having a catalog for providing selectivities and keys, said computer program product comprising:

a recording medium;

means recorded on said medium for instructing said computer to perform the steps of, (a) forming a set of keys from said key and unique keys selected from said catalog; and (b) obtaining a cardinality for said key by choosing the minimum cardinality value for said key comprising said set.

35. A memory for storing data for access by a program being executed on a data processing system, comprising:

a data structure stored in said memory, said data structure including information resident in a database used by said program and including;

a plurality of data objects stored in said memory, each of said data objects containing different information from said database;

a grouping of data objects as columns;

a data object as an equivalence class for each column in said grouping;

a data object representing an equivalence class determining an effective cardinality for each of said columns belonging to said equivalence class;

a data object representing a cardinality for each set of equivalence classes by being chosen as the minimum effective cardinality for the columns belong to said equivalence class; and a data object representative of a cardinality value for said grouping of columns from the product of said cardinalities for said equivalence classes.

36. A memory for storing data for access by a program being executed on a data processing system, comprising:

a data structure stored in said memory, said data structure including information resident in a database used by said program and including;

a plurality of data objects stored in said memory, each of said data objects containing different information from said database;

a data object representing a grouping of columns;

a data object representing one or more partitions from columns in said grouping, said partitions having a plurality of subsets with each set subset comprising a column or a selected index key;

a data object representing an index key cardinality for each of said subsets;

a data object representing a cardinality for said partition from the product of the effective index key cardinalities for each subset belonging to said partition; and a data object representative of a cardinality value for a grouping of columns being chosen to represent the minimum cardinality from the cardinalities determined for each of said partitions.

37. A memory for data processing or access by a program being executed on a data processing system, comprising:

a data structure stored in said memory, said data structure including information resident in a database used by said program and including;

a plurality of data objects stored in said memory, each of said data objects containing different information from said database;

a data object for functional dependencies for a column belonging to a key formed from a grouping of columns belonging to a table;

a column deletion data object which is functionally determined by another column in said key;

a data object for repeating column deletion until all functionally determined columns are deleted;

a data object representative of an effective column cardinality for each remaining column; and a data object representing a cardinality for said key being chosen from a minimum of said effective cardinalities.

38. A memory for storing data for access by a program being executed on a data processing system, comprising:

a data structure stored in said memory, said data structure including information resident in a database used by said program and including;

a plurality of data objects stored in said memory, each of said data objects containing different information from said database;

a data structure stored in said memory, said data structure including information resident in a database used by said program and including;

a plurality of data objects stored in said memory, each of said data objects containing different information from said database;

a data object for a key formed from a grouping of columns in a table;

a data object functionally dependent on the columns belonging to said grouping of columns;

a data object obtained by deleting a column which is functionally determined by another column, such deletion being effected until all functionally determined columns have been deleted;

a data object representing an effective columns cardinality for each of the remaining columns; and a data object representing a cardinality value for the grouping of columns, such object being chosen by the minimum cardinality from the cardinalities determined for each of the remaining columns.

39. A memory for storing data for access by a program being executed on a data processing system, comprising:

a data structure stored in said memory, said data structure including information resident in a database used by said program and including;

a plurality of data objects stored in said memory, each of said data objects containing different information from said database;

a data object representing a key from a grouping of columns in a table, the columns being provided in a catalog, and the grouping of columns as being used for estimating cardinalities for a key;

a data object representing a set of keys from said key and unique keys selected from the catalog; and a data object representing a cardinality for said key having been chosen by the minimum cardinality value for said keys comprising said set.

40. A computer program product for use on a computer wherein queries involving a grouping operation that forms a grouping key are entered for retrieving data from a database having a catalog having information about keys and for providing selectivities, said computer program product comprising:

a recording medium;

means recorded on said medium for instructing said computer to perform the steps of, (a) forming a set of keys from unique keys selected from said catalog; and (b) obtaining a cardinality for said grouping key by choosing the minimum cardinality value among the set of unique keys.

* * * * *

UNITED STATES PATENT AND TRADEMARK OFFICE
CERTIFICATE OF CORRECTION

PATENT NO. : 5,761,653
DATED : June 2, 1998
INVENTOR(S) : Bernhard Schiefer, et al.

It is certified that error appears in the above-identified patent and that said Letters Patent is hereby corrected as shown below:

| COL | LINE | DESCRIPTION OF ERROR |
|---|---|---|
| (75) | Invent, 2 | insert --both of Canada-- after the word "Etobicoke" |
| (75) | Invent, 3 | insert -- CA. -- after the word "Emeryville" |
| (75) | Invent, 3 | delete "all of Canada" after the word "Emeryville" |
| 9 | 20 | delete "is a" before the word "statistically" |
| 13 | 15 | insert --to-- after the word "used" |
| 13 | 40 | delete "the" after the word "of" |
| 15 | Clm 6, 21 | "ff_" should read --ff_1-- |
| 22 | Clm 35, 29 | "belong" should read --belonging-- |
| 22 | Clm 37, 56 | "data processing or access" should read --storing data for access-- |

Signed and Sealed this

Eleventh Day of April, 2000

Attest:

Attesting Officer

Q. TODD DICKINSON

Director of Patents and Trademarks